H. H. BORN & H. A. RECEN.
TUNNELING MACHINE.
APPLICATION FILED OCT. 25, 1911.
1,081,524.
Patented Dec. 16, 1913.
3 SHEETS—SHEET 1.
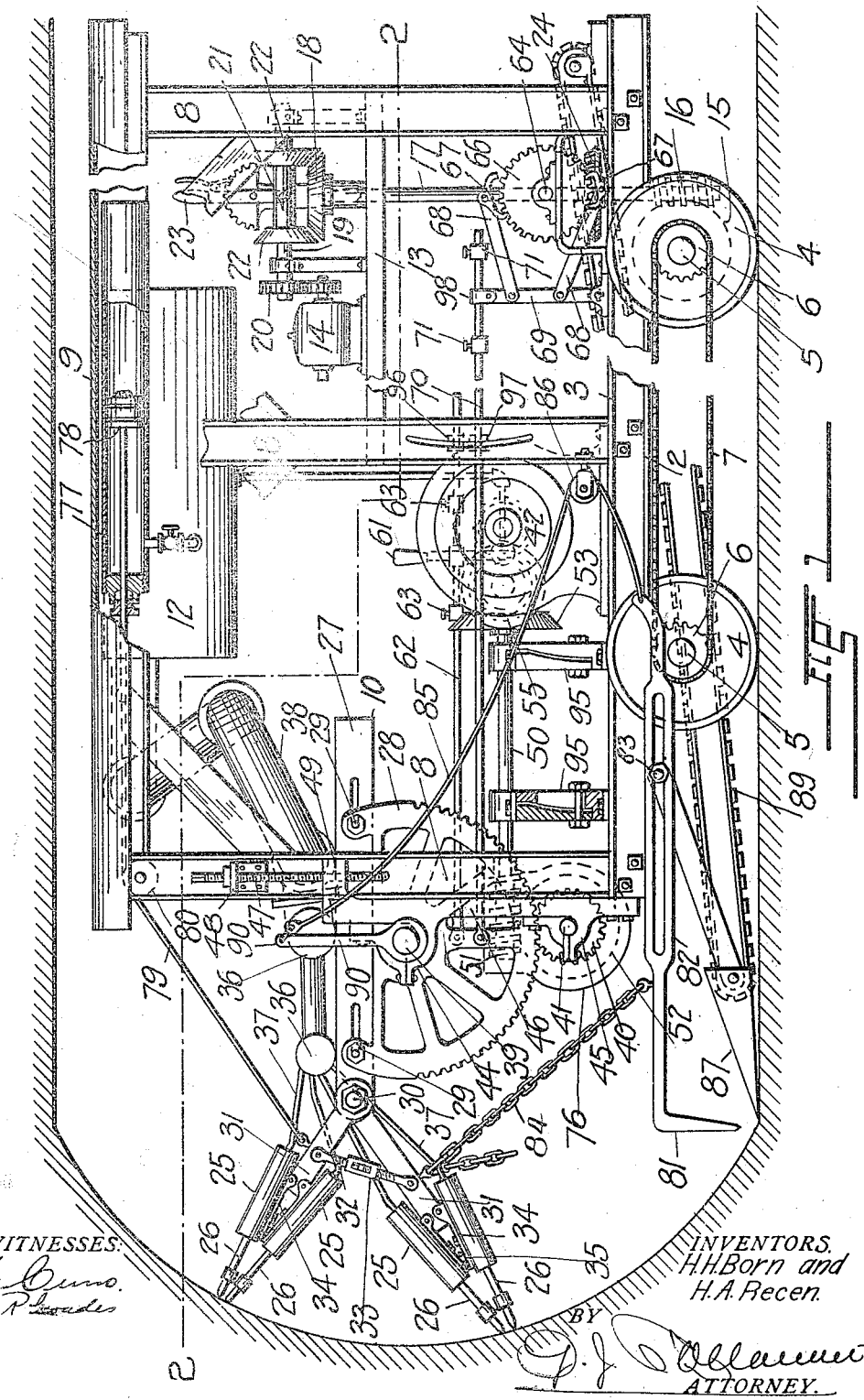
WITNESSES:
F. H. Cuno.
L. P. Rhoades.
INVENTORS.
H. H. Born and
H. A. Recen.
BY
ATTORNEY.

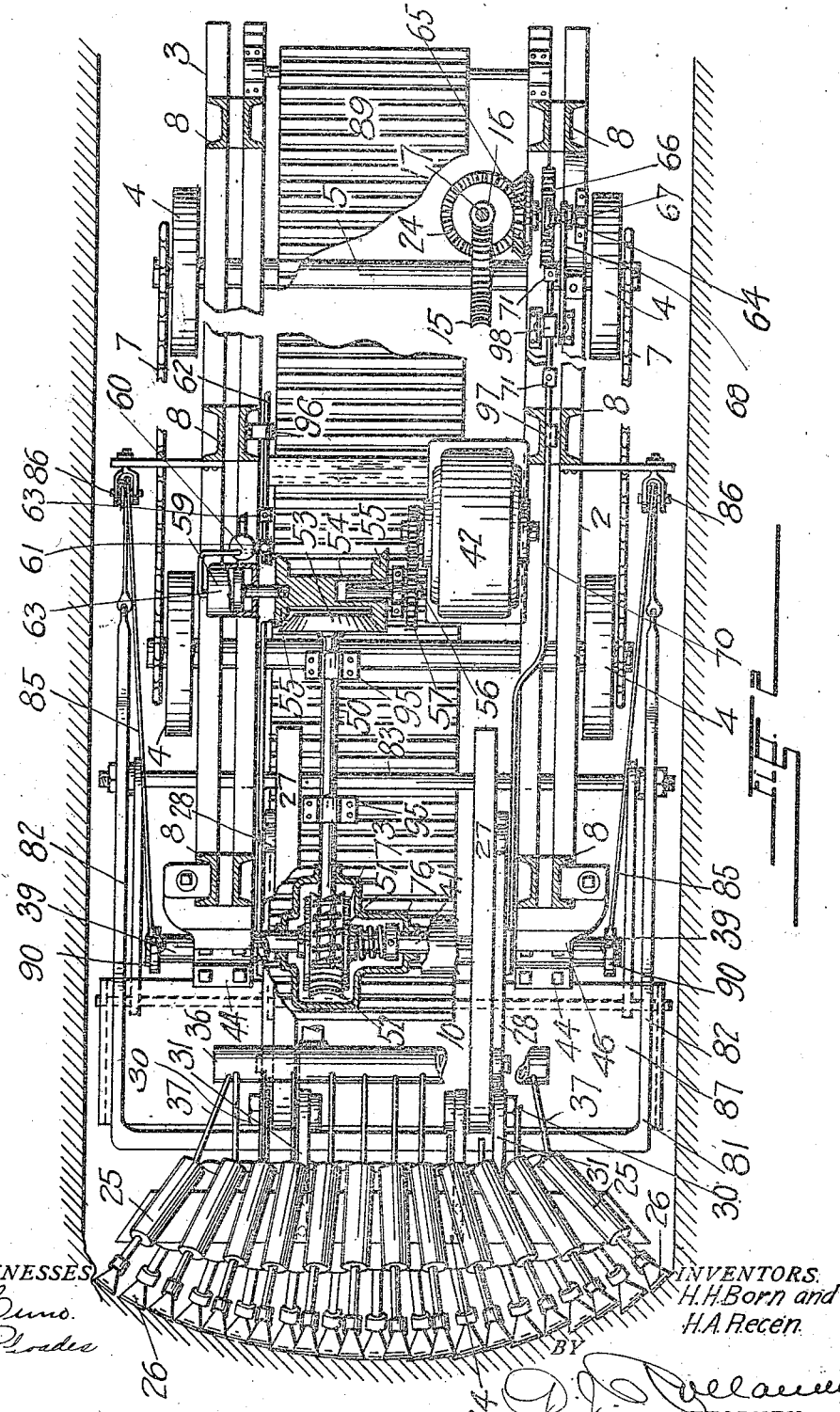

H. H. BORN & H. A. RECEN.
TUNNELING MACHINE.
APPLICATION FILED OCT. 25, 1911.
1,081,524.
Patented Dec. 16, 1913.
3 SHEETS—SHEET 3.
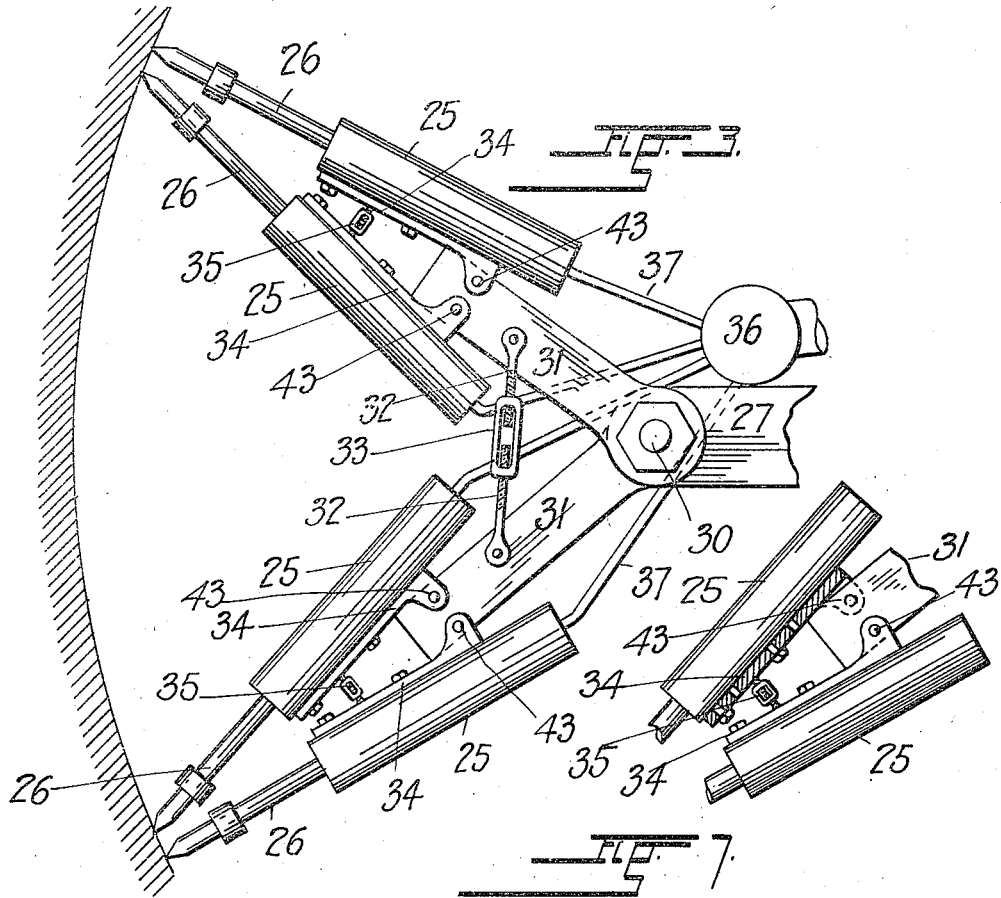
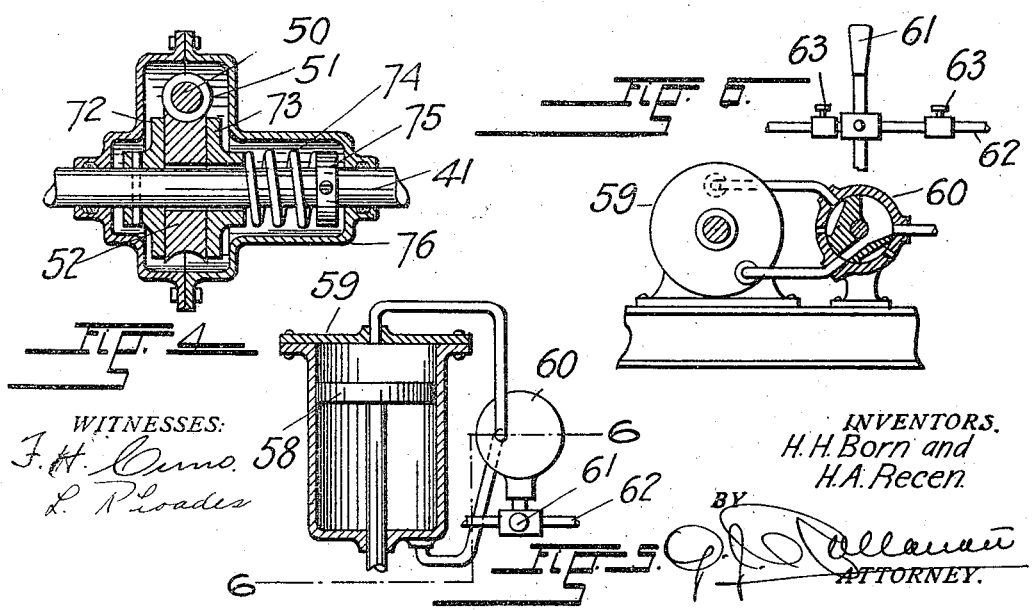
WITNESSES:
INVENTORS.
H. H. Born and
H. A. Recen
BY
ATTORNEY.

UNITED STATES PATENT OFFICE.

HERMAN H. BORN AND HENRY A. RECEN, OF DENVER, COLORADO, ASSIGNORS, BY DIRECT AND MESNE ASSIGNMENTS, OF ONE-SIXTH TO SAID RECEN, ONE-SIXTH TO PHILLIP A. PEREGRINE, AND TWO-THIRDS TO FRANK V. GOETZ, ALL OF DENVER, COLORADO.

TUNNELING-MACHINE.

1,081,524.     Specification of Letters Patent.     Patented Dec. 16, 1913.

Application filed October 25, 1911. Serial No. 656,690.

*To all whom it may concern:*

Be it known that we, HERMAN H. BORN and HENRY A. RECEN, citizens of the United States of America, residing at Denver, in the county of Denver and State of Colorado, have invented certain new and useful Improvements in Tunneling-Machines, of which the following is a specification.

Our invention relates to tunneling machines and more particularly to certain new and useful improvements in machines of the type shown and described in our application for patent Serial Number 573,833, filed in the United States Patent Office on the 26th day of July in the year 1910.

The principal objects of the present invention reside in the provision of certain features of construction by which the oscillatory head which carries the battery or batteries of impact-tools is rendered adjustable to adapt the machine for use in the production of excavations of different dimensions; in the provision of a mechanism which in connection with the oscillatory head, automatically feeds the machine toward the breast of the excavation; in the provision of automatic means for reversing the movements of the head; in the provision of a pneumatic spring to counterbalance the weight of the head during downward movement thereof; in the provision of a friction-clutch by means of which the operative connection between the head and the motor by which it is driven, is automatically discontinued when the head is subjected to unusual stress and, in the provision of an improved mechanism for removing the muck from t' bottom of the excavation during downward movement of the head.

In the accompanying drawings, in the various views of which like parts are similarly designated, Figure 1 represents a fragmentary side elevation of the machine, Fig. 2, a horizontal section taken along the line 2—2 Fig 1; Fig. 3 an enlarged elevation of the front-end of the oscillatory head, Fig. 4 a sectional view of the friction-clutch included in the construction, Fig. 5 an enlarged sectional plan view of the air cylinder and valve included in the reversing mechanism, Fig. 6 a section taken along the line 6—6 Fig. 5, and Fig. 7 a fragmentary view partially in section, of the front end of the head.

Referring more specifically to the drawings, the reference numeral 2 designates a carrier composed of a platform 3 which is supported upon wheels 4, secured at opposite ends of parallel axles 5 which are rotatably mounted in suitable bearings below the platform 3 and which are connected to rotate in unison by means of sprocket-wheels 6 and corresponding endless chains 7.

Standards 8 erected upon the platform together with a roof 9, constitute a superstructure which carries the oscillatory head 10 at the front end of the machine, a reservoir 12 for compressed air, an elevated platform 13 at the rear end of the machine for the support of an electric motor 14, and other parts of the mechanism as will hereinafter be described.

The motor 14 being provided to impel the machine in either direction, is connected with the rear-axle by means of a transmission mechanism which comprises a worm-wheel 15 fixed on the axle, a worm 16 meshing with the said wheel, at the lower extremity of an upright shaft 17, a beveled friction-wheel 18 secured at the upper extremity of the shaft, a horizontal shaft 19, which by means of gear wheels 20 is connected with the armature shaft of the motor and a sleeve 21 which is slidably keyed on the shaft 19 and which carries at its opposite ends beveled wheels 22 adapted to be brought separately in frictional engagement with the wheel 18. A lever 23 of suitable construction is provided to adjust the position of the sleeve on the shaft 19. The upright shaft 17 is furthermore provided with a beveled gear-wh ͏  ͏ which forms part of the automatic feeu͏͏͏_ mechanism which will hereinafter be described.

The oscillatory head 10 at the forward end of the machine carries two batteries of impact engines 25 each of which is composed of two convergent series, the cutting tools 26 of which have their working edges in horizontal alinement. The head 10 consists essentially of a supporting frame, the parallel side-bars 27 of which are longitudinally adjustably connected with toothed segments 28. The latter are to this end provided with bolts which project through slots in the bars as shown in Fig. 1 of the drawings, and whose protruding, threaded ends carry nuts 29 by means of which the parts may be clamped in their adjusted positions.

The side bars 27 carry at their forward ends, transverse bolts 30 for the pivotal connection of two divergent pairs of arms 31, the corresponding members of which are adjustably connected by means of pivotal, oppositely-threaded bolts 32 and therewith associated turn-buckles 33. The ends of the bolts 30 are threaded and nuts screwed upon the said ends, serve to clampingly secure the connected arms 31 in their adjusted position on the respective side-bars. The arms of each pair are connected by means of two convergent plates 34 which are articulately attached thereto at their rearward edges, as at 43, and which near their opposite edges are connected by bolts and turn-buckles 35, which serve to adjust their angle of convergence.

The impact engines 25 comprised in the two series of each battery are firmly and separately adjustably secured upon the plates 34, as shown in Fig. 7 and they are, in the operation of the machine supplied with motive fluid from the reservoir 12 by means of communicating manifolds 36 mounted on the oscillatory frame, pipes 37 which connect the forward manifold separately with the cylinders of the several engines, and a swivel-jointed conduit 38 which connects the rearward manifold with the reservoir. The latter is supplied with compressed air by means of an air-compressor which is preferably mounted on the platform 3 and which for obvious reasons has been omitted from the drawings.

The two segments 28 are fixed upon a horizontal shaft 39 and they are engaged by gear-wheels 40 on another shaft 41 which is operatively connected with a motor 42 on the platform by means of a transmission mechanism hereinafter to be described. The two shafts 39 and 41 are revolubly mounted at their extremities in bearing boxes 44 and 45 formed integral with sliding bars 46, which are vertically adjustably connected with the foremost pair of standards 8 comprised in the super-structure. This connection is established by the use of two endless screws 47 which are rotatably mounted in brackets 48 on the standards and which extend through correspondingly threaded openings in lugs 49 at the upper extremities of the bars 46.

The mechanism by means of which the rotary motion of the armature shaft of the motor 42 is transmitted to the shaft 41, comprises a horizontal shaft 50 which is rotatably supported on pedestals 95, and which is provided at one of its ends with a worm 51 which meshes with a worm-wheel 52 on the shaft 41, and at its opposite end with a beveled friction wheel 53.

A sleeve 54 having at its opposite ends, beveled wheels 55, is slidably keyed upon a transverse shaft 56 which by means of gears 57 is connected with the motor-shaft, and the sleeve is connected with a piston 58 fitted in a cylinder 59, for the purpose of moving the beveled wheels at its ends, alternately into frictional engagement with the larger wheel 53.

In the operation of the machine, the opposite ends of the cylinder 59 are alternately brought in communication with the reservoir 12 through the instrumentality of a three-way valve 60, the stem of which is provided with a handle 61 to enable the operator to control the movements of the oscillatory head 10. Ordinarily, however, the valve 60 is reversed automatically when the head reaches the ends of its up-and-downward movements, by means of a rod 62 which is slidably mounted in bearings on the super-structure, and which is pivotally connected with one of the segments 28. The rod 62 carries two adjustable tappets 63 which are disposed at opposite sides of the valve handle 61 to alternately engage the same during the reciprocating movement of the rod imparted thereto by its connection with the segment 28.

The mechanism for automatically advancing the machine toward the breast of the excavation comprises a shaft 64 provided with a beveled gear wheel 65 which engages the before mentioned wheel 24 on the upright shaft 17. A ratchet-wheel 66 fixed on the shaft 64 is engaged at opposite sides of its center by pawls 67 which are respectively pivotally attached at the ends of arms 68 which are articulately connected with a rocker-arm 69 mounted on the platform 3. A rod 70 slidably mounted in bearings on the super-structure, is pivotally connected with one of the segments 28 on the oscillatory head, and it carries two adjustable tappets 71, which alternately engage the rocker arm 69 during the reciprocating motion of the rod, to impart through the instrumentality of the pawls 67 and the ratchet wheel 66, an intermittent rotary movement to the shaft 64 which movement is by means of the gear-wheels 65 and 24, the worm 16 and the worm-wheel 15, transmitted to the axles 5 of the carrier.

It will be understood that while the above described automatic feeding mechanism is in operation, both the driving friction wheels 22 are separated from the driven wheel 18 on the shaft 17, and that when the motor-driven transmission mechanism is employed to impel the carrier in either direction, the two pawls 67 are lifted out of engagement with the teeth of the ratchet-wheel 66 by reversing their position on the pivots by which they are connected with the respective arms 68.

To prevent stripping of the teeth of the segments 28 and the gear-wheels 40, or other damage to the transmission-mechanism by unusual stress on the oscillatory head, as for example, in case a rock dislodged from the excavation falls upon the supporting frame, the worm-wheel 52 is connected with the shaft 41 by means of a friction clutch shown in Fig. 4 of the drawings. The wheel 52 is to this end, loosely mounted on the shaft in between two disks 72 and 73, one of which is fixed on the shaft while the other is resiliently held in frictional engagement with the wheel by a coiled spring 74 which abuts against a fixed collar 75 on the shaft.

A housing 76 surrounding the parts is provided to protect them from dust and falling rocks. The weight of the oscillatory head 10 is, during the downward movement thereof, counter-balanced by means of a pneumatic spring comprising a cylinder 77 which communicates at its forward end with the reservoir 12, and a piston 78 which is fitted in the cylinder and which is connected with the forward portion of the head by means of a cable 79 which runs over a sheave 80.

To remove the muck which, during the operation of the machine, falls to the bottom of the excavation, we provide a scraper 81 formed at the forward end of two longitudinally slotted, parallel bars 82 which have a combined longitudinal and pivotal movement upon the extremities of a shaft 83 which is supported below the platform. The forward portion of this scraper is suspended from the corresponding portion of the head 10 by means of a chain 84, while the rearward ends of the bars 82 are connected with lever-arms 90 on the extremities of the shaft 39, by means of cables 85 which run over sheaves 86 on the superstructure of the machine.

An inclined plow-blade 87 is loosely connected at the forward end of the platform to engage the floor of the excavation and an endless belt conveyer 89 is provided to carry the muck moved across the blade 87 by the action of the scraper 81, to the rear end of the machine.

The scraper 81, is during the upward movement of the head 10, raised from contact with the blade 87 and moved forwardly toward the breast of the excavation by reason of its connection with the forward portion of the head, and when the latter moves downwardly, it descends by gravity until it engages the forward portion of the blade 87 and is drawn rearwardly across the same by means of the cables 85 which connect the ends of the bars 82 with the arms 90 on the shaft 39.

It will be understood that by adjusting the position of the frame which carries the batteries of impact-tools, on the segments 28, the length of the arc traversed by the cutting edges on the steels 26, and in consequence, the vertical dimension of the excavation, may be readily varied, that by changing the angle of convergence of the pairs of arms 31, the extent of the oscillatory movement of the head required to engage the entire breast of the excavation, may be varied, that by vertical adjustment of the connected bearings 44 and 45 which support the shafts 39 and 41, the height of the excavation above the surface upon which the machine is supported, is determined, and that by adjustment of the plates 34 which support the series of impact-tools comprised in each battery, the alinement of the cutting edges of the tools may be maintained, irrespective of the length of the said tools.

To maintain the operative connections between the shafts 39 and 41 on the head and the therewith associated parts of the mechanism which are mounted on the platform 3, while the head is vertically adjusted by means of the screws 47, the pedestals 95 are made extensible in a vertical direction, the bearings 96 and 97 in which the rods 62 and 70 are supported are vertically adjustable in slots in the standards 8 to which they are secured, and the rocker-arm 69 is provided at its upper end with a pivotally connected sleeve 98 which serves to guide the rod 70 and to maintain it in its operative position relative to the arm.

It will furthermore be observed that the detachability of the plates 34 permits of their being interchanged with plates of greater length in case it is desired to increase the number of impact tools comprised in each series for the purpose of producing an excavation of greater width.

By separately adjusting the tools comprised in each battery which may be readily accomplished by inserting the bolts by which they are secured, in different holes of the series formed in the plates 34, as shown in Fig. 7, their cutting edges may be arranged in either a curved or straight line in accordance with the form desired for the floor and roof of the excavation.

Where two batteries are employed, as in the construction shown in the drawings, the cutting edges on the upper one may be arranged in a curved line and those on the lower one in a straight line, with the result that the excavation produced by the operation of the machine will have a level floor and an arched roof.

While the impact-tools may be of any desired form we prefer to employ straight edged chisels, it being understood that in the operation of the engines, the tools do not rotate, but disintegrate the rock by their impact upon the surface thereof.

We wish it understood that while we have shown and described our improved tunneling machine in the best form at present known to us, variations in the construction and the arrangement of the parts by which the various functions are performed, may be resorted to within the spirit of our invention and that, while we do not desire to limit ourselves to the use of any special impact engine, we preferably employ engines of the character shown and described in our applications for patent, Serial Numbers 573,834 and 629,693, in which a reciprocating hammer is impelled by compressed air to forcibly engage the end of a steel longitudinally movably supported at the end of the housing in which said hammer has its movement.

Having thus described our invention, what we claim and desire to secure by Letters-Patent is:—

1. In a tunneling machine, a carrier, a head having an oscillatory movement about a horizontal axis at the forward end thereof, a battery of cutting-tools on said head, an element having an inclined surface, connected with said carrier to engage a surface upon which the latter is supported, a scraper adapted to move muck produced by action of said cutting-tools, rearwardly across said surface, and a conveyer for moving the muck falling from said surface to the rear end of the carrier, the said scraper being connected with said head to be operated thereby during its downward movement.

2. In a tunneling machine, a carrier, a head having an oscillatory movement about a horizontal axis at the forward end thereof, a battery of cutting tools on said head, a conveyer for moving muck produced by action of said cutting tools toward the rear end of the carrier, a scraper adapted to move the muck toward said conveyer, and a connection between said scraper and the head for operating the former during downward movement of the latter.

3. In a tunneling machine, a carrier, a head having an oscillatory movement about a horizontal axis at the forward end thereof, a battery of cutting tools on said head, a conveyer for moving muck produced by action of said cutting-tools toward the rear end of the carrier, a device for moving the muck onto said conveyer, and connections between said head and said device whereby the latter is raised during upward movement of the head and lowered and actuated during downward movement of the same.

4. In a tunneling machine, a carrier, a head having an oscillatory movement about a horizontal axis, at the forward end thereof, a battery of cutting tools on said head, a conveyer for moving muck produced by action of said cutting-tools toward the rear end of the carrier, a scraper adapted to move the muck toward said conveyer and connections between said head and said scraper whereby the latter is raised and moved forwardly during upward movement of the head and lowered and moved rearwardly during downward movement of the same.

5. In a tunneling machine, a support, a head having an oscillatory movement thereon, convergent plates articulately connected with said head, series of cutting tools on said plates, and means for adjusting the angle of convergence between said plates by moving them about their axes of articulation.

6. In a tunneling machine, a support, a head having an oscillatory movement thereon, convergent plates on said head, series of cutting tools on said plates, and means for varying the angle of convergence between the same.

7. In a tunneling machine, a support, a head having an oscillatory movement about a horizontal axis thereon, two batteries of cutting tools arranged on said head, one above the other, the cutting edges of the tools of each battery being horizontally alined, and means for adjusting said batteries to vary the distance between the lines of their respective cutting edges.

8. In a tunneling machine, a support, a frame having an oscillatory movement thereon, divergent arms pivotally mounted at an end of said frame, batteries of cutting tools at the ends of said arms, and means for adjusting the angle of divergence between said arms.

9. In a tunneling machine, a support, a frame having an oscillatory movement thereon, divergent arms pivotally mounted at an end of said frame, batteries of cutting tools at the ends of said arms, and each comprising two convergent series, means for adjusting the angle of divergence between said arms, and means for adjusting the angle of convergence between said series.

10. In a tunneling machine, a carrier, a head having an oscillatory movement about a horizontal axis at the forward end thereof, and a battery of reciprocating cutting tools mounted on the said head to engage a surface in front of said carrier, means for advancing said carrier toward said surface, said head being adjustably mounted to vary the distance between the cutting edges of said tools and the said axis, whereby to vary the depth of an excavation produced by the action of said tools.

11. In a tunneling machine, a wheeled carrier, a toothed segment mounted thereon to rotate about a horizontal axis, a head connected with said segment, a battery of reciprocating cutting tools mounted on the said head to engage a surface in front of said carrier, means for advancing said carrier toward said surface, and means on said carrier for imparting a reciprocating movement to said head by operative engagement with said segment, the said head being adjustable on the said segment to vary the distance between its axis of oscillation and the cutting edges of said tools, whereby to vary the depth of an excavation produced by action of the same.

12. In a tunneling machine, a carrier, a head having an oscillatory movement thereon, a battery of cutting tools on said head comprising two convergent series the cutting edges of which are alined in a plane substantially parallel to the axis of oscillation of said head, and means for varying the angle of convergence of said series to maintain said alinement irrespective of the length of said tools.

13. In a tunneling machine, a carrier, a frame vertically, adjustably mounted thereon, a battery of cutting tools mounted to oscillate about a horizontal axis on said frame, a power transmission mechanism for oscillating said battery, disposed partly on said frame and partly on said carrier, the last mentioned part of said mechanism being adjustable to maintain it in its operative relation to its part on said frame when the latter is adjusted to a different position for varying the elevation of said axis.

14. In a tunneling machine, a carrier, a head having an oscillatory movement thereon, two batteries of cutting tools on said head, their respective cutting edges being alined, and means for changing the distance between the lines of the cutting edges on the said batteries.

In testimony whereof we have affixed our signatures in presence of two witnesses.

HERMAN H. BORN.
HENRY A. RECEN.

Witnesses:
  G. J. ROLLANDET,
  L. RHOADES.